US011725108B2

(12) United States Patent
Naito et al.

(10) Patent No.: US 11,725,108 B2
(45) Date of Patent: Aug. 15, 2023

(54) BIOMASS COMPOSITION AND BIOMASS MOLDED BODY

(71) Applicant: Panasonic Intellectual Property Management Co., Ltd., Osaka (JP)

(72) Inventors: Shigeki Naito, Hyogo (JP); Naohiko Maeda, Osaka (JP); Ayano Fujimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 605 days.

(21) Appl. No.: 16/627,888

(22) PCT Filed: Oct. 9, 2018

(86) PCT No.: PCT/JP2018/037516
§ 371 (c)(1),
(2) Date: Dec. 31, 2019

(87) PCT Pub. No.: WO2019/097899
PCT Pub. Date: May 23, 2019

(65) Prior Publication Data
US 2020/0172733 A1   Jun. 4, 2020

(30) Foreign Application Priority Data

Nov. 14, 2017 (JP) ................................. 2017-219227

(51) Int. Cl.
*C08L 97/02* (2006.01)
*C08K 3/28* (2006.01)
*C08K 3/30* (2006.01)
*C08K 5/092* (2006.01)

(52) U.S. Cl.
CPC ................ *C08L 97/02* (2013.01); *C08K 3/28* (2013.01); *C08K 3/30* (2013.01); *C08K 5/092* (2013.01); *C08K 2003/3054* (2013.01)

(58) Field of Classification Search
CPC ................................. C08K 5/092; C08L 97/02
See application file for complete search history.

(56) References Cited

U.S. PATENT DOCUMENTS

| 7,426,775 B2 * | 9/2008 | Forshey ................. C08L 29/04 28/103 |
| 2004/0249066 A1 | 12/2004 | Heinzman |
| 2011/0174191 A1 | 7/2011 | Uemura |
| 2012/0302699 A1 | 11/2012 | Kobune |
| 2014/0011042 A1 | 1/2014 | Sugawara et al. |
| 2014/0238268 A1 | 8/2014 | Umemura |
| 2017/0051316 A1 | 3/2017 | Yamashita |

FOREIGN PATENT DOCUMENTS

| CN | 103443233 A | 12/2013 | |
| CN | 103687912 A | 3/2014 | |
| JP | 2006-282960 A | 10/2006 | |
| JP | 2006-526064 A | 11/2006 | |
| JP | 2011-218775 A | 11/2011 | |
| JP | 2012-012549 A | 1/2012 | |
| JP | 2016-055620 A | 4/2016 | |
| WO | 2010/001988 A1 | 1/2010 | |
| WO | WO-2013190777 A1 * | 12/2013 | .............. C08J 5/045 |
| WO | 2014095293 A1 | 6/2014 | |
| WO | 2015/174529 A1 | 11/2015 | |
| WO | 2017/169321 A1 | 10/2017 | |

OTHER PUBLICATIONS

Machine translation of WO-2013190777-A1 (Year: 2013).*
Office Action issued in corresponding Chinese Patent Application No. 201880047130.7, dated May 8, 2021.
Extended European Search Report for corresponding EP Application No. 18879611.4 dated Oct. 26, 2020.
International Search Report and Written Opinion for corresponding Application No. PCT/ JP2018/037516, dated Jan. 15, 2019.
Victor M Chernyshev et al., "Conversion of plant biomass to furan derivatives and sustainable access to the new generation of polymers, functional materials and fuels", Russian Chemical Reviews, 2017, 86(5), 357-387.

* cited by examiner

*Primary Examiner* — Wenwen Cai
(74) *Attorney, Agent, or Firm* — Renner, Otto, Boisselle & Sklar, LLP

(57) ABSTRACT

A biomass composition contains powder of parenchyma cells of a plant containing a saccharide, a multivalent carboxylic acid and an intermediate product of juice of the plant and a multivalent carboxylic acid. The intermediate product is a substance in an intermediate step of curing reaction. The intermediate product is synthesized by adding the multivalent carboxylic acid to the juice of the plant and causing preliminary reaction by heat treatment.

6 Claims, No Drawings

BIOMASS COMPOSITION AND BIOMASS MOLDED BODY

TECHNICAL FIELD

The present disclosure generally relates to biomass compositions and biomass molded bodies. The present disclosure specifically relates to a biomass composition containing a ground product of a plant and a biomass molded body which is a hardened material of the biomass composition.

BACKGROUND ART

A composition that can be used as a raw material for molding bodies and adhesives is known in the art (see, for example, Patent Literature 1). The composition described in Patent Literature 1 is a composition curable by heat and pressure and contains a powdered or fragmented plant-derived material and polycarboxylic acid as main components.

In the composition described in Patent Literature 1, the polycarboxylic acid probably functions as a catalyst for promoting curing reaction. To secure water resistance, a certain amount of catalyst is required, but the amount of use of catalyst such as acids is desirably small.

CITATION LIST

Patent Literature

Patent Literature 1: WO 2010/001988

SUMMARY OF INVENTION

It is an object of the present disclosure to provide a biomass composition configured to provide a biomass molded body having excellent water resistance with less catalyst than before and the biomass molded body.

A biomass composition according to one aspect of the present disclosure includes: powder of parenchyma cells of a plant containing a saccharide; and a multivalent carboxylic acid.

A biomass molded body according to one aspect of the present disclosure is a hardened material of the biomass composition.

DESCRIPTION OF EMBODIMENTS (1) Schema

A biomass composition according to the present embodiment includes: powder of parenchyma cells of a plant containing a saccharide; and a multivalent carboxylic acid. In particular, parenchyma cells are adopted, and thereby, a biomass molded body having excellent water resistance is obtainable with less catalyst than before.

(2) Details (2.1) Biomass Composition

A biomass composition according to the present embodiment includes: powder of parenchyma cells of a plant containing a saccharide; and a multivalent carboxylic acid. The biomass composition is usable as an adhesive and is also usable as a molding material. That is, the biomass composition can, as an adhesive, bond a plurality of members to each other. The biomass composition can, as a molding material, form a plate by itself or form a surface layer on a surface of another member.

Essential components contained in the biomass composition will be specifically described below.

First, the plant will be described. Plants are roughly classified into woody plants (so-called trees) and herbaceous plants (so-called grass), but the plant here may be a woody plant or a herbaceous plant. The plant is preferably a palm, and among different types of palms, an oil palm and a coconut palm are preferable. This is because palms contain a relatively large amount of saccharide in their parenchyma cells compared to other plants.

Meanwhile, in Southeast Asia, a palm oil industry is active, but palm trees becomes less fruitful in 20 to 30 years. Therefore, disposal of such old palm trees has become a problem. This is because burning old wood is prohibited in order to prevent greenhouse gas emissions, and in addition, recycling palm trees as timber is difficult due to a high water content of the palm trees. For these reasons, beneficial use of felled old palm trees and the like is desired, and thus, felled old palm trees and the like are readily available as raw materials for the biomass composition.

Next, the powder of parenchyma cells of the plant will be described. The powder of parenchyma cells of the plant is obtainable in the following way. First, stems of the plant is ground and squeezed to divide then into a residue and juice. The residue is then dried to obtain a primary ground product. The residue is dried in order to evaporate water in the residue. After the primary ground product is obtained, the primary ground product may further be ground to obtain a secondary ground product as necessary. Particles forming the secondary ground product are averagely smaller than those forming the primary ground product. The primary ground product or the secondary ground product is then sieved. The nominal opening of a sieve used herein is, for example, larger than or equal to 250 μm and smaller than or equal to 850 μm in accordance with JIS Z8801-1, and preferably about 500 μm. The primary ground product or the secondary ground product is then divided into a first residue that has passed through the sieve and a second residue that has not passed through the sieve. When the first residue and the second residue are compared with each other, the first residue contains more parenchyma cells. Here, the parenchyma cells are cells which are included in parenchyma tissue of a plant body and which perform critical physiological activities such as anabolism, depot, decomposition, and secretion, and the parenchyma cells contain a saccharide. The parenchyma tissue including the parenchyma cells is found in the epidermis, pith, mesophyll, and pulp of the plant body. Since the parenchyma cells are contained more in the first residue than in the second residue, the first residue is usable as the powder of parenchyma cells of the plant. Note that since the juice contains a water-soluble saccharide dissolved therein, the juice is usable to synthesize an intermediate product which will be described later. Since the second residue contains more vascular bundles than the first residue, the second residue is usable as fiber which will be described later.

The saccharide contained in the powder of parenchyma cells of the plant includes monosaccharides, disaccharides, and polysaccharides (including oligosaccharides). The disaccharide and the polysaccharide are each configured by glycoside linkage of a plurality of monosaccharides. Examples of the monosaccharide include fructose, ribose, arabinose, rhamnose, xylulose, and deoxyribose. Examples of the disaccharide include sucrose, maltose, trehalose, Turanose, lactulose, Maltulose, Palatinose, gentiobiulose, melibiulose, galactosucrose, lutinulose, and Planteobiose. Examples of the polysaccharide include starch, agarose, alginic acid, glucomannan, inulin, chitin, chitosan, hyaluronic acid, glycogen, and cellulose. Examples of the oligosaccharide include fructo-oligosaccharide, galacto-oligosaccharide, mannan oligosaccharide, and stachyose. Only one kind of saccharide, or two or more kinds of saccharides, may be contained in the powder of parenchyma cells of the plant.

Next, the multivalent carboxylic acid will be described. The multivalent carboxylic acid is not particularly limited as long as it is a compound including a plurality of carboxy groups. Examples of the multivalent carboxylic acid include citric acid, tartaric acid, malic acid, gluconic acid, sebacic acid, itaconic acid, succinic acid, oxalic acid, adipic acid, malonic acid, phthalic acid, maleic acid, fumaric acid, glutaric acid (1,5-pentanedioic acid), glutaconic, acid and pentenedioic acid. As the multivalent carboxylic acid, an acid anhydride may also be used.

Of the multivalent carboxylic acids listed above, citric acid, tartaric acid, malic acid, gluconic acid, sebacic acid, and itaconic acid are particularly preferred because they are produced from plants as raw materials. When plants are adopted as raw materials as in this case, the use of fossil resources is suppressed, and therefore, the biomass composition is obtainable without imposing a burden on the environment. The biomass composition may contain only one type of multivalent carboxylic acid or two or more types of multivalent carboxylic acids. Note that the multivalent carboxylic acid is synonymous with a polycarboxylic acid.

In particular, adopting parenchyma cells of a plant enables the amount of use of the multivalent carboxylic acid, which functions as a catalyst, to be limited a small amount. Specifically, the content of the multivalent carboxylic acid may be greater than or equal to 0.3 wt. % and less than or equal to 5 wt. % with respect to the total amount of the biomass composition. This content is less than the content of the polycarboxylic acid in the composition described in, for example, Patent Literature 1. Therefore, it is possible: to suppress an acid-induced reduction in strength of the biomass molded body, which is the hardened material of the biomass composition; and/or to suppress environmental degradation caused by elution of acid.

Basically, the biomass composition is obtainable by blending the powder of parenchyma cells of the plant containing the saccharide with the multivalent carboxylic acid described above. Both the powder of parenchyma cells of the plant and the multivalent carboxylic acid are, in general, readily available. This, therefore, enables the biomass composition to be produced with low cost.

When the biomass composition is heat-treated, the biomass composition cures completely through two-step reaction. That is, first-step reaction (hereinafter sometimes referred to as "preliminary reaction") proceeds due to heat treatment and is completed, and second-step reaction proceeds due to further heat treatment and is completed. The biomass composition becomes a hardened material upon completion of the two-step reaction. In the first-step reaction and the second-step reaction, the temperature of the biomass composition increases. However, between the first-step reaction and the second-step reaction, the temperature of the biomass composition does not increase but is maintained for a definite time period. The biomass composition between the first-step reaction and the second-step reaction is thermoplastic and water-soluble. As the state of the biomass composition approaches the second-step reaction, the biomass composition becomes thermosetting. The biomass composition as an adhesive or a molding material may be in a state prior to the preliminary reaction or in a state after the preliminary reaction and prior to the second-step reaction.

The biomass composition after the preliminary reaction will now be described. The heat treatment for the preliminary reaction hydrolyzes the saccharide contained in the powder of parenchyma cells of the plant, thereby producing a hydrolysate product. In addition, the hydrolysate product dehydrates and condenses, thereby producing a reaction product of a sugar-modified substance.

For example, when the saccharide is sucrose, the biomass composition is presumed to cure in the following reaction. First, the sucrose hydrolyzes to generate glucose and fructose. Dehydration reaction of the fructose then generates furfural (specifically, 5-(hydroxymethyl)furfural). The furfural, which is the sugar-modified substance, is further heat-treated, thereby becoming a furan resin, which is a thermosetting resin, and the furan resin cures in the presence of the multivalent carboxylic acid. On the other hand, the glucose becomes a sugar ester polymer due to dehydration and condensation reaction and cures.

In the present embodiment, the primary ground product which is the residue after drying is not used as is, but the second residue is removed from the primary ground product (or the secondary ground product, which is a further ground product of the primary ground product), and the remaining first residue is used. When the primary ground product is compared with the first residue, the first residue has a higher content of parenchyma cells and thus a higher content of saccharide. In this manner, since the content of the saccharide is increased, the catalyst efficiency is increased, and therefore, a biomass molded body is obtainable which has excellent water resistance with less catalyst than before. Since the multivalent carboxylic acid is considered to function as a catalyst, the multivalent carboxylic acid undergoes no significant modification and remains as is.

Thus, in a state where the preliminary reaction by heat treatment is completed, the biomass composition contains the reaction product of the sugar-modified product. The biomass composition in this state is thermoplastic and water soluble.

Optional components contained in the biomass composition will be specifically described below. In this case, the biomass composition may be in a state either before or after the preliminary reaction. The preliminary reaction may be caused after the optional components are contained in the biomass composition.

The biomass composition preferably further contains an intermediate product of the juice of the plant and the multivalent carboxylic acid. Here, the intermediate product is a substance in an intermediate step of curing reaction. The intermediate product is similar to, as it were, a biomass composition after the preliminary reaction. Thus, the intermediate product is also usable as an adhesive. Synthesis of the intermediate product is possible by adding the multivalent carboxylic acid to the juice of the plant and causing preliminary reaction by the heat treatment. The additive amount of multivalent carboxylic acid in this case is, for example, greater than or equal to 5 parts by pass and less than or equal to 100 parts by mass with respect to 100 parts by mass of saccharide contained in the juice of the plant. As the juice of the plant, juice obtained by grinding and squeezing the plant as described above may be used. Specific examples of the multivalent carboxylic acid are similar to those described above. The heat treatment for the preliminary reaction evaporates water or the like in the intermediate product, so that the intermediate product becomes a solid. The solid may directly be blended with the biomass composition but is preferably pulverized into powder, or the powder thus obtained is dissolved in a solvent such as water to provide an aqueous solution. This facilitates uniform blending of the intermediate product with the biomass composition. The biomass composition further containing the intermediate product enables excellent strength to be imparted to the biomass molded body. Note that since the intermediate product has a function as an adhesive, the intermediate product not only is used as an optional component in the biomass composition but also is usable independently.

The biomass composition preferably further contains at least one of ammonium sulfate or ammonium chloride. When the biomass composition is heat-treated, the ammonium sulfate and the ammonium chloride function, similarly to the multivalent carboxylic acid, as catalysts for the curing reaction of saccharides. This enables excellent water resistance to be imparted to the biomass molded body.

In general, the esterification reaction of hydroxy groups in powder of parenchyma cells of a plant with a multivalent carboxylic acid proceeds relatively slowly over time. Therefore, blending at least one of ammonium sulfate or ammonium chloride as the catalyst with the biomass composition enables a reaction time of the esterification to be reduced.

The content of at least one of ammonium sulfate or ammonium chloride (when both ammonium sulfate or ammonium chloride are contained, the total content thereof) is preferably greater than or equal to 0.3 wt. % and less than or equal to 5 wt. % with respect to the total weight of the biomass composition. This enables the reaction time of the esterification to further be reduced. Moreover, it is possible to further improve the water resistance of the biomass molded body. Since ammonium sulfate and ammonium chloride are relatively less acidic salts, the strength of the biomass molded body is maintained.

The biomass composition preferably further contains fibers. Thus, depending on fibers used, it is possible to increase the strength and/or to increase water resistance of the biomass molded body. The average length of the fibers is not particularly limited but is, for example, within a range from 50 μm to 5 mm inclusive. The average diameter of the fibers is not particularly limited but is, for example, within a range from 5 μm to 1 mm inclusive.

Here, the fibers are roughly classified into organic fibers and inorganic fibers. Specific examples of the organic fibers include the above-mentioned second residue and woodchips. Examples of a raw material for the woodchips include wood resulting from thinning trees and timber resulting from demolition of buildings. Examples of the wood resulting from the thinning of trees include coniferous wood such as pine, cedar, and cypress, and broadleaf wood such as rawan, capole, and poplar. Examples of the timber resulting from demolition of buildings include plywoods, particleboards, medium-density fiber boards, and oriented strand board. Thus, the fibers are preferably plant-derived fibers. Such plant-derived fibers enable the strength of the biomass molded body to be increased. In addition, the plant-derived fibers are preferably fibers of the vascular bundles of palms. This enables old palm trees and the like to be beneficially utilized. On the other hand, specific examples of the inorganic fibers include rock wool and glass fibers. The rock wool is man-made mineral fiber obtained by melting natural rock or molten slag and blowing off with centrifugal force or the like to be in fibrous form.

The biomass composition may contain a ground product of agricultural wastes such as bamboos and chaff.

The biomass composition may contain a thickener and am accelerant in a range that does not inhibit the effects of the present embodiment. As a catalyst for the esterification reaction, at least one of ammonium sulfate or ammonium chloride may be used in combination with a p-toluenesulfonic acid.

The biomass composition is preferably substantially free from organic solvents, formaldehyde, and tertiary amine. The tertiary amine may decompose, thereby generating formaldehyde. These substances are volatile organic compounds (VOCs) or sources from which the volatile organic compounds are generated. Therefore, the biomass composition substantially free from the above-mentioned substances can be environmentally friendly. Note that saying "substantially free from the above-mentioned substances" means that an extremely small amount of the above-mentioned substances may be contained as impurities or the like as long as they do not adversely affect the environment.

(2.2) Biomass Molded Body

The biomass molded body according to the present embodiment is a hardened material of the biomass composition. Therefore, the biomass molded body has excellent water resistance and is thus widely usable, for example, in architectural material, furniture, and dwelling house interior decoration. The biomass molded body can be produced by thermocompression molding of the biomass composition. Conditions of the thermocompression molding are not particularly limited. The molding temperature is, for example, higher than or equal to 140° C. and lower than or equal to 230° C. The molding time is, for example, longer than or equal to 10 seconds and shorter than or equal to 1 minute. The molding pressure is, for example, higher than or equal to 0.5 MPa and lower than or equal to 4 MPa. The biomass molded body may have a simple shape such as a plate shape or may be a complicated shape other than the plate shape.

(3) Summary

As described above, a biomass composition of a first aspect includes: powder of parenchyma cells of a plant containing a saccharide; and a multivalent carboxylic acid According to this aspect, it is possible to obtain a biomass molded body having excellent water resistance with a smaller amount of catalyst than the conventional one.

A biomass composition of a second aspect referring to the first aspect further contains an intermediate product of juice of the plant and a multivalent carboxylic acid.

This aspect enables excellent strength to be imparted to the biomass molded body.

In a biomass composition of a third aspect referring to the first or second aspect, the plant is a palm.

This aspect enables old palm trees and the like to be beneficially used.

A biomass composition of a fourth aspect referring to any one of the first to third aspects further contains at least one of ammonium sulfate or ammonium chloride.

This aspect enables water resistance to be imparted to the biomass molded body.

A biomass compositions according to a fifth aspect referring to any one of the first to fourth aspects further contains fibers.

According to this aspect, depending on the fibers used, it is possible to increase the strength and/or to increase water resistance of the biomass molded body.

In a biomass composition of a sixth aspect referring to the fifth aspect, the fibers are plant-derived fibers.

This aspect enables the strength of the biomass molded body to be increased.

In a biomass composition of a seventh aspect referring to the sixth aspect, the plant-derived fibers are fibers of a vascular bundle of a palm.

This aspect enables old palm trees and the like to be beneficially used.

A biomass molded body of an eighth aspect is a hardened material of the biomass composition of any one of the aspects 1 to 7.

According to this aspect, the biomass molded body has excellent water resistance and is thus widely usable, for example, in architectural material, furniture, and dwelling house interior decoration.

EXAMPLES

The present disclosure will be specifically described with reference to examples, but the present disclosure is not limited to the following examples.

Examples 1 to 7

A palm (oil palm) was used as a plant. First, palm trunks were ground and squeezed to divide them into a residue and juice. Then, the residue was dried to obtain a primary ground product, and the primary ground product was further ground to obtain a secondary ground product. The secondary ground product was then sieved. The nominal opening of a sieve used is 500 μm in accordance with JIS Z8801-1. The secondary ground product was divided into a first residue that has passed through the sieve and a second residue that has not passed through the sieve. The first residue and the second residue were observed in a magnified manner by using a microscope or the like. As a result, it was confirmed that the first residue contains palm parenchyma cells as main components, and the second residue contains palm vascular bundles as main components. The juice (solid content: about 10 wt. %) was used to produce a juice composition serving as an intermediate product. That is, first, 25 parts by mass of citric acid was added to 100 parts by mass of saccharide to obtain a mixture, which is then heated at 105° C. to obtain a solid. This solid was then pulverized into powder, thereby obtaining the juice composition.

As woodchips, ground products of conifer wood were adopted. The woodchips have an average length of 2 mm and an average diameter of 500 μm.

As a rock wool pulverized product, rock wool pulverized with a planetary agitator was used. The rock wool pulverized product has an average length of 100 μm and an average diameter of 5 μm.

The biomass compositions of Examples 1 to 7 were prepared by blending components in amounts shown in Table 1. Then, the biomass compositions were molded by thermocompression under conditions shown in Table 1, thereby producing biomass molded bodies each having a plate-like shape.

Comparative Example 1 to 4

The same woodchips as those described above were used.

As bagasse, pieces obtained by grinding with a mill a residue remaining after sugar cane was squeezed to obtain sugar were used, the pieces having an average length of 15 mm and an average diameter of 3 mm.

The biomass compositions of Comparative Examples 1 to 4 were prepared by blending components in amounts shown in Table 1. Then, the biomass compositions were molded by thermocompression under conditions shown in Table 1, thereby producing biomass molded bodies each having a plate-like shape.

<Assessment>

[Moldability]

Moldability was evaluated by checking the biomass molded body in its thickness direction for cracks.

[Hygroscopic Thickness Swelling Rate]

To evaluate water resistance, a hygroscopic thickness swelling rate test was performed in accordance with JIS A 5908.

[Peeling Strength]

To evaluate the strength, a peeling strength test was performed in accordance with JIS A 5908.

TABLE 1

| | | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|---|
| Biomass Compos. (wt. %) | Fiber | Palm Bundle | 0 | 0 | 66 | 0 | 80 | 0 | 0 | 0 | 0 | 0 | 0 |
| | | Woodchip | 0 | 0 | 0 | 66 | 0 | 33 | 0 | 80 | 80 | 97 | 0 |
| | | Rock Wool Ground Product | 0 | 0 | 0 | 0 | 0 | 33 | 0 | 0 | 0 | 0 | 0 |
| | | Bagasse | 0 | 0 | 0 | 0 | 0 | 0 | 0 | 0 | 0 | 0 | 97 |
| | Parenchyma Cell of Plant | Palm Parenchyma Cell | 97 | 97 | 33 | 33 | 10 | 33 | 97 | 0 | 0 | 0 | 0 |
| | Intermediate Product | Juice Cpd. | 0 | 0 | 0 | 0 | 9 | 0 | 0 | 0 | 0 | 0 | 0 |
| | Multivalent Carboxylic Acid | Citric Acid | 3 | 2.7 | 0.9 | 0.9 | 0.9 | 0.9 | 2.7 | 20 | 20 | 3 | 3 |
| | Ammonium Sulfate | | 0 | 0.3 | 0.1 | 0.1 | 0.1 | 0.1 | 0 | 0 | 0 | 0 | 0 |
| | Ammonium Chloride | | 0 | 0 | 0 | 0 | 0 | 0 | 0.3 | 0 | 0 | 0 | 0 |
| Biomass Molded Body | Thickness | mm | 3 | 3 | 3 | 3 | 3 | 3 | 3 | 3 | 3 | 3 | 3 |
| | Density | kg/m$^3$ | 800 | 800 | 800 | 800 | 800 | 800 | 800 | 800 | 800 | 800 | 800 |
| Molding Condition | Temperature | ° C. | 220 | 220 | 220 | 220 | 220 | 220 | 220 | 220 | 220 | 220 | 220 |
| | Time | sec. | 30 | 30 | 30 | 30 | 30 | 30 | 30 | 300 | 30 | 30 | 30 |
| | Pressure | kg/cm$^2$ | 40 | 40 | 40 | 40 | 40 | 40 | 40 | 40 | 40 | 40 | 40 |
| Evaluation | Moldability (Presence/Absence of Cracks) | — | Absent | Absent | Absent | Absent | Absent | Absent | Absent | Absent | Present | Present | Present |

TABLE 1-continued

|  |  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Hygroscopic Thickness Swelling Rate | % | 10 | 5 | 8 | 15 | 5 | 2 | 6 | 10 | 20 or higher | 20 or higher | 20 or higher |
| Peeling Strength | MPa | 0.4 | 0.4 | 0.7 | 0.7 | 1.0 | 0.3 | 0.4 | 0.4 | 0.1 or less | 0.1 | 0.2 |

As can be seen from Table 1, in Examples 1 to 7, the hygroscopic thickness swelling rate is suppressed to 15% or less while the content of multivalent carboxylic acid is 3 wt. % or less. That is, it can be seen that a small amount of catalyst provides an excellent water resistance.

In contrast, from results of Comparative Examples 3 and 4, it can be seen that the water resistance degrades with the same amount of catalyst as in Example 1. A result of Comparative Example 2 shows that the water resistance is low even if the amount of the catalyst is larger than that in Example 1. Furthermore, from the result of Comparative Example 1, it can be seen that the same level of performance as that of Example 1 is obtainable only after the amount of catalyst is increased and the forming time is increased as compared with Example 1.

The invention claimed is:

1. A method for manufacturing a biomass composition, the method comprising:
    grinding and squeezing a plant containing a saccharide to divide it into a residue and juice, wherein the plant is a palm,
    synthesizing an intermediate product by adding a multivalent carboxylic acid to the juice and causing preliminary reaction by heat treatment, the intermediate product being a substance in an intermediate step of curing reaction, and
    mixing the intermediate product, powder of parenchyma cells of the plant, and
    a multivalent carboxylic acid together.

2. The method of claim 1, further comprising mixing at least one of ammonium sulfate or ammonium chloride.

3. The method of claim 1, further comprising mixing fibers.

4. The method of claim 3, wherein the fibers are plant-derived fibers.

5. The method of claim 4, wherein the plant-derived fibers are fibers of a vascular bundle of a palm.

6. A method for manufacturing a biomass molded body, the method comprising:
    hardening the biomass composition manufactured by the method of claim 1.

* * * * *